(12) United States Patent
Marcin et al.

(10) Patent No.: US 10,681,398 B1
(45) Date of Patent: Jun. 9, 2020

(54) VIDEO ENCODING BASED ON VIEWER FEEDBACK

(71) Applicant: Twitch Interactive, Inc., San Francisco, CA (US)

(72) Inventors: Ivan Marcin, Palo Alto, CA (US); Brad Schumitsch, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 36 days.

(21) Appl. No.: 15/368,186

(22) Filed: Dec. 2, 2016

(51) Int. Cl.
| | |
|---|---|
| *H04N 7/173* | (2011.01) |
| *H04N 21/236* | (2011.01) |
| *H04N 21/2187* | (2011.01) |
| *H04N 21/24* | (2011.01) |
| *H04N 21/2383* | (2011.01) |
| *H04N 21/845* | (2011.01) |

(52) U.S. Cl.
CPC ....... *H04N 21/236* (2013.01); *H04N 21/2187* (2013.01); *H04N 21/2383* (2013.01); *H04N 21/2407* (2013.01); *H04N 21/845* (2013.01)

(58) Field of Classification Search
CPC ........... H04N 21/8186; H04N 21/2187; H04N 21/4532; H04N 21/2385; H04N 21/23424; H04N 21/26216; H04N 21/47214; H04N 21/21805; H04N 21/4884; H04N 21/64738; H04N 21/234327

USPC ... 725/116, 139, 110, 32, 40, 46, 14, 86, 61, 725/98, 135
See application file for complete search history.

(56) References Cited

U.S. PATENT DOCUMENTS

| | | | |
|---|---|---|---|
| 8,713,196 B1* | 4/2014 | Gormley | H04L 47/525 709/235 |
| 9,866,877 B2* | 1/2018 | Shrum, Jr. | H04N 21/234327 |
| 2006/0080171 A1* | 4/2006 | Jardins | G06Q 10/087 705/14.68 |
| 2008/0273591 A1* | 11/2008 | Brooks | H04N 7/1675 375/240.01 |
| 2016/0286244 A1* | 9/2016 | Chang | H04N 21/21805 |

\* cited by examiner

*Primary Examiner* — Nnenna N Ekpo
(74) *Attorney, Agent, or Firm* — BakerHostetler

(57) ABSTRACT

Techniques for video encoding based on viewer feedback are described herein. Feedback data collected from viewers of video content may be used to determine a provider score value and a provide duration value. The provider score value may indicate a quantity of viewers for content from the provider. The provider duration value may indicate a transmission duration for content from the respective provider. An upgrade threshold may be determined, which is a value associated with assignment of additional channels for encoding of video content. When video content from the provider is available for transmission, the provider score for the provider may be compared to the upgrade threshold value to determine whether the additional channels will be assigned for encoding of the video content. In some examples, multiple upgrade thresholds may be employed, for example corresponding to multiple time ranges identified based on the provider duration value.

15 Claims, 8 Drawing Sheets

VIDEO ENCODING BASED ON VIEWER FEEDBACK

BACKGROUND

The transmission of video content over communications networks, such as the Internet, has increased dramatically in recent years. While the use of communications networks for video transmission provides several advantages, the bandwidth and other constraints of such networks may often force a number of limitations and trade-offs. For example, some clients with more favorable transmission characteristics (e.g., better network conditions, more robust processing and memory resources, etc.) may often be able to receive and present video with higher image quality, while clients with less favorable conditions (e.g., poorer network conditions, less robust processing and memory resources, etc.) may often be forced to receive and present video with lower image quality in order to avoid transmission delays and errors. One approach for handling these trade-offs is to generate, by a server, a number of transmission streams that are encoded at different image qualities (e.g., different encoding bitrates, different resolutions, etc.) with respect to one another and to allow connected clients to select a video stream that best fits their particular respective transmission characteristics. However, one drawback of this approach is that encoding of these multiple video streams may consume large amounts of processing and other server resources. For pre-stored and/or non-live video content (e.g., certain on-demand content), this may be less problematic as the pre-encoding of the multiple streams may be spread over time prior to transmission. However, for live video content, the burden of simultaneously encoding multiple video quality streams, for potentially large quantities of different content items, may be particularly disadvantageous and may potentially exhaust available server resources.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
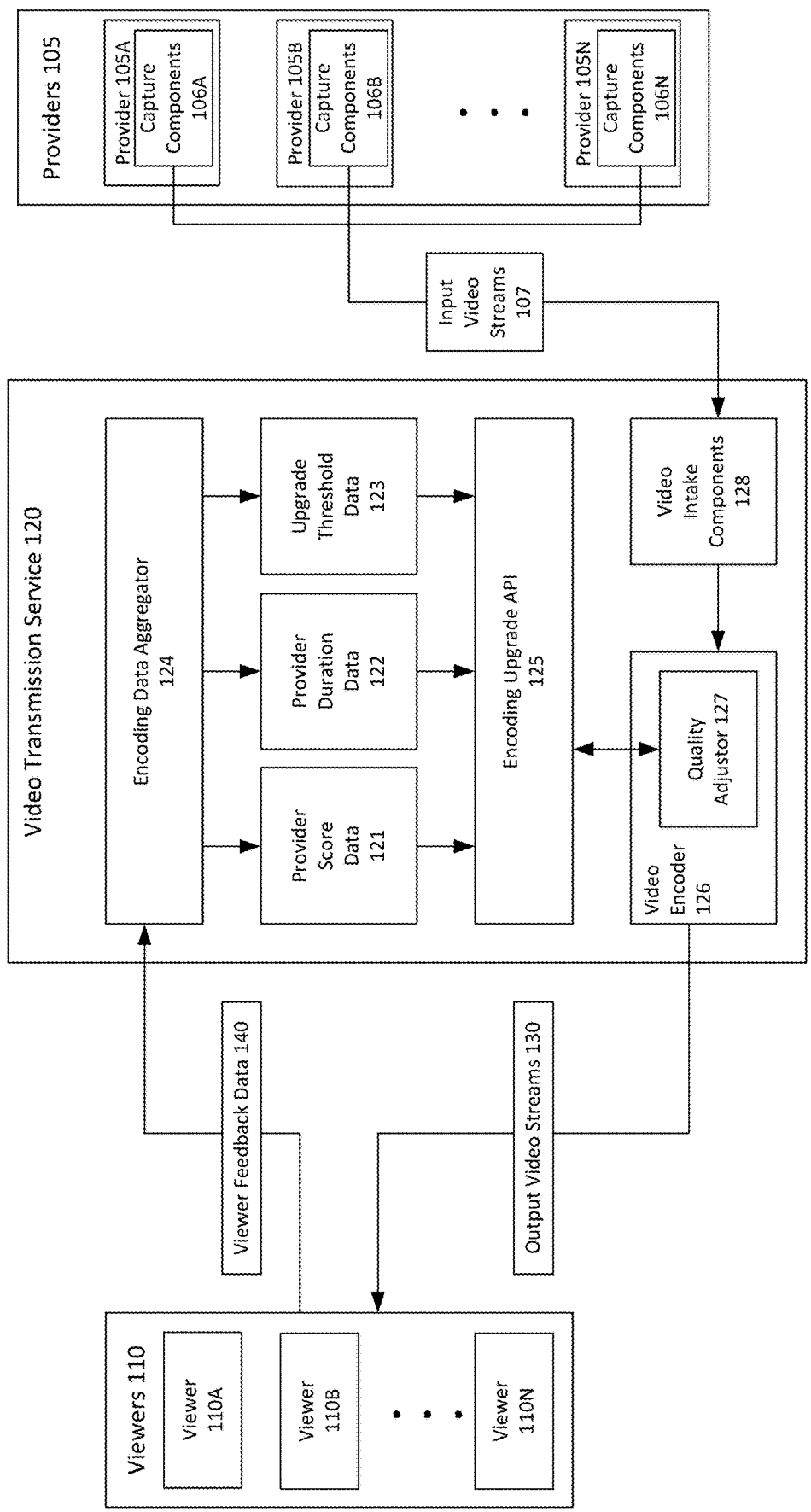
FIG. 1 is a diagram illustrating an example system for video encoding based on viewer feedback that may be used in accordance with the present disclosure.

Techniques for video encoding based on viewer feedback are described herein. In some examples, a video transmission service may transmit video content to viewers over a communications network such as the Internet, for example using streaming video transmission techniques. In some cases, the video content may be provided to the video transmission service by a number of different providers. The video content may include, for example, live video content that is captured by a provider, promptly transmitted by the provider to the video transmission service, and then, in turn, promptly transmitted by the video transmission service to one or more viewers. In one specific example, the video transmission service may be a service that streams live video game content, and the providers may be video game players that capture the live video game content using screen capture software.

In some examples, the video transmission service may encode certain transmitted video items using a variety of video streams having different image qualities (e.g., different encoding bitrates, different resolutions, etc.) with respect to another. This may be advantageous, for example, by allowing each viewer to select to receive a video stream that is best suited for the particular transmission characteristics (e.g., network conditions, processing and memory resources, etc.) of that viewer. As set forth above, however, one drawback of this approach is that the encoding of the multiple video streams of differing quality may consume large amounts of processing and other server resources. Thus, in some cases, the video transmission service may be unable to encode all transmitted video content from all providers using multiple streams. Accordingly, to conserve server resources, certain video content may be encoded and transmitted using only a single stream without varying image quality.

Accordingly, in some cases, the video streaming service may make determinations about whether to encode a particular video content item using multiple streams or using only a single stream. This determination may, for example, be made prior to transmission of the content, as adding or removing streams during transmission of the content may require transmission to be stopped and viewers to be disconnected. In some examples, the techniques described herein may allow a strategic determination of how many video streams to employ for encoding of a particular video content item. In some cases, this strategic determination may be based, at least in part, on an expected quantity of viewers for the particular video content item. In particular, in some examples, items with relatively larger quantities of expected viewers may generally tend to be granted more encoding streams, while items with relatively smaller quantities of expected viewers may generally tend to be granted fewer encoding streams. In some cases, these criteria may be advantageous to viewers, for example by allowing larger quantities of viewers to select from multiple video streams with increased video quality options, while also limiting content items with fewer video quality options to smaller quantities of viewers. As described in detail below, however, basing encoding quality determinations strictly upon viewership quantity alone may sometimes lead to unfavorable results. Thus, in some examples, other criteria may also be included in the encoding quality determinations. These other criteria may include, for example, an expected transmission duration of the content, current available video encoding resources for the service, expected future available video encoding resources for the service, and many other factors.

In some examples, the determination criteria described above may be based, at least in part, on feedback information collected by the video transmission service from viewers of the video content. In some cases, the viewer feedback information may include information related to quantities of viewers and duration of viewership for a particular transmitted content item. For example, in some cases, viewers of a particular content item may send a periodic heartbeat signal back to the video transmission service, and the video transmission service may use this heartbeat signal to determine that a viewer is receiving a particular content item and to determine a duration of the transmission of the content item. The viewer quantity and transmission duration information may be aggregated over different content providers, for example to determine various metrics for the different providers. In some examples, the provider metrics may include a provider score value that is determined based, at least in part, on the relative historical viewership quantity of a respective provider relative to other providers. The provider metrics may also include a provider duration value that is determined based, at least in part, on the historical duration of content transmitted by a respective provider. In some examples, these metrics may be continually updated, adjusted and cached based on newly collected feedback information, such as to form a moving average or other updated moving value.

Additionally, in some examples, the video transmission service may determine one or more threshold scores for encoding additional (e.g., more than one) encoded video streams for a particular content item. In some cases, the video transmission service may divide each day (or other time period) into a number of time ranges, and each time range may be assigned its own respective threshold score. In some examples, a threshold score for a current (or nearly current) time range may be based, at least in part, on current available video encoding resources for the service, while a threshold score for a future time range may be based, at least in part, on expected future available video encoding resources for the service.

When a provider requests to transmit a video content item, a video encoder may collect and retrieve metrics such as those described above in order to determine how many encoding streams to assign to the content item. For example, the provider's respective score and duration values may be retrieved. In some examples, the provider's duration value may be used to identify one or more time ranges within at least part of which the transmission of the content item is expected to at least partly occur. Next, the provider's respective score may be compared against the threshold score for each of the identified time ranges. In some examples, if the provider's score meets or exceeds the threshold score for each of the identified time ranges, then additional encoded video streams may be assigned for transmission of the video content item. By contrast, in some examples, if the provider's score does not meet or exceed the threshold score for each of the identified time ranges, then additional encoded video streams may not be assigned for transmission of the video content item.

FIG. 1 is a diagram illustrating an example system for video encoding based on viewer feedback that may be used in accordance with the present disclosure. As shown in FIG. 1, video transmission service 120 receives video content via input video streams 107 from providers 105A-N. Video content from providers 105A-N may be received by the video transmission service 120 via video intake components 128. Video transmission service 120 may then transmit the received video content to viewers 110A-N via output video streams 130. Input video streams 107 and output video streams 130 may be transmitted over one or more communications networks, for example including one or more local area networks (LAN's) or one or more wide area networks (WAN's) such as the Internet. In some examples, input video streams 107 and output video streams 130 may be transmitted using streaming transmission techniques, in which portions of transmitted content may be received and presented to viewers while subsequent portions of the transmitted content are still in the process of being transmitted.

In the example of FIG. 1, providers 105A-N each operate respective capture components 106A-N, which may capture video content that is generated by the providers 105A-N. In some specific examples, providers 105A-N may be video game players, and capture components 106A-N may include software that captures video from video games that are played by providers 105A-N. Also, in some examples, video transmission service 120 may be a service that streams video game content to various subscribers, such as viewers 110A-N. It is noted that capture components 106A-N may also include other types of video capture components, such as video cameras, for example for capturing video from a news or sporting event.

In some examples, the video content that is provided to viewers 110A-N via streams 107 and 130 may include live video content that may be displayed to viewers 110A-N almost immediately (e.g., with only a small time delay) after being captured by providers 105A-N. The live video content may be captured by a provider 105A-N, promptly transmitted by the provider 105A-N to the video transmission service 120 and then, in turn, promptly transmitted by the video transmission service 120 to one or more viewers 110A-N.

As shown in FIG. 1, video encoder 126 may encode video content for transmission from video transmission service 120 to viewers 110A-N. In some examples, the video encoder 126 may encode certain video items using a variety of video streams having different image qualities (e.g., different encoding bitrates, different resolutions, etc.) with respect to another. This may be advantageous, for example, by allowing each viewer 110A-N to select to receive a video stream that is best suited for the particular transmission characteristics (e.g., network conditions, processing and memory resources, etc.) of that viewer 110A-N. As set forth above, however, one drawback of this approach is that the encoding of the multiple video streams of differing quality may consume large amounts of processing and other resources at video transmission service 120. Thus, in some cases, the video encoder 126 may be unable to encode all transmitted video content from all providers using multiple streams. Accordingly, to conserve server resources, certain video content may be encoded and transmitted using only a single stream without varying image quality. Accordingly, in some cases, the video encoder 126 may make determinations about whether to encode a particular video content item using multiple streams or using only a single stream. This determination may, for example, be made prior to transmission of the content, as adding or removing streams during transmission of the content may require transmission to be stopped and viewers to be disconnected.

Encoding stream determinations such as described above may be based, at least in part, on viewer feedback data 140 collected from viewers 110. In some cases, the viewer feedback data 140 may include information related to quantities of viewers and duration of viewership for a particular transmitted content item. For example, in some cases, viewers 110A-N of a particular content item may send a periodic heartbeat signal back to the video transmission service 120, and the video transmission service 120 may use this heartbeat signal to determine that a viewer is receiving a particular content item and to determine a duration of the transmission of the content item. It is noted, however, that a heartbeat signal is merely one example technique for obtaining viewer feedback data 140, and that other techniques may also be employed, such as by periodically querying or pulling data from the viewers 110A-N or by other techniques.

As shown in FIG. 1, the viewer feedback data 140 may be received by encoding data aggregator 124. Encoding data aggregator 124 may receive, parse, and sort the received viewer feedback data 140. Encoding data aggregator 124 may also use the received viewer feedback data 140 to generate, update, and maintain certain encoding-related data, including provider score data 121, provider duration data 122, and upgrade threshold data 123. In particular, in some cases, the viewer feedback data 140 may include an indication of the particular providers 105A-N from which video content is being viewed by the viewers 120A-N. The encoding data aggregator 124 may then aggregate the viewer feedback data 140 using this provider information for input to provider score data 121 and provider duration data 122.

Provider score data 121 may include respective provider score values for one or more of providers 105A-N. As will be described in detail below, in some examples, a provider score value may be a value associated with a quantity of viewers for content provided by a respective provider 105A-N. For example, the provider score value may indicate an estimated quantity of viewers for video content provided by a respective provider 105A-N. Each provider score value may, for example, be set relative to score values for other providers for which viewer feedback data 140 has been collected. In some examples, a provider score value may be determined based, at least in part, on a historical quantity of viewers for video content that is provided by a respective provider 105A-N, such as an average historical quantity of viewers. In some examples, the provider score values may be weighted using various criteria, for example to weight more recent data more heavily than older data. The provider score values may, for example, be continually updated, adjusted and cached based on newly collected viewer feedback data 140, such as to form a moving average or other updated moving value. For example, in some cases, the provider score values may be continually updated to reflect a moving average for a prior time period, such as a prior two weeks or other prior time period. It is noted, however, that the provider score values need not necessarily be equivalent to any particular calculated quantity of viewers, and may instead merely reflect respective relative weights, percentages, or other values.

Provider duration data 122 may include respective provider duration values for one or more of providers 105A-N. As will be discussed in detail below, in some examples, a provider duration value may be used to indicate a transmission duration that video content from a respective provider 105A-N may be expected to have. In some examples, a provider duration value may be determined based, at least in part, on a historical transmission duration of video content that is provided by a respective provider 105A-N, such as an average historical transmission duration. In some examples, the provider duration values may be weighted using various criteria, for example to weight more recent data more heavily than older data. The provider duration values may, for example, be continually updated, adjusted and cached based on newly collected viewer feedback data 140, such as to form a moving average or other updated moving value. For example, in some cases, the provider duration values may be continually updated to reflect a moving average for a prior time period, such as a prior two weeks or other prior time period.

Upgrade threshold data 123 may include data regarding one or more upgrade threshold values. In some examples, in order to be granted an encoding upgrade, such as additional encoding channels of varying quality, a provider score value for a provider may be required to meet or exceed one or more upgrade threshold values. In some examples, upgrade threshold data 123 may be determined by collecting data associated with usage of various resources (e.g., used and available encoding channels, used and available processing resources, etc.) available to the video transmission service 120. This collected resource usage information may include both current and recently collected information as well as historical information.

In some examples, a provider 105A-N may send a request to the video transmission service 120 to indicate that the provider 105A-N is ready to provide a video content item to the video transmission service 120 for transmission to one or more viewers 120A-N. An indication of this request may be provided to the video encoder 126, which may make a determination regarding whether or not the provider 105A-N is to receive an encoding upgrade (e.g., additional encoding channels of varying image quality) for the transmission. In particular, quality adjustor 127 may make this determination based, at least in part, on information retrieved from provider score data 121, provider duration data 122, and upgrade threshold data 123. Specifically, quality adjustor 127 may issue one or more application programming interface (API) calls to encoding upgrade API 125 to retrieve information from provider score data 121, provider duration data 122, and upgrade threshold data 123 that is associated with the current transmission request. Quality adjustor 127 may then use this retrieved information to make a determination of whether the provider is eligible for an encoding upgrade for the requested transmission, for example based on criteria such as will be described in detail with reference to FIGS. 2-5.

Figure 2:
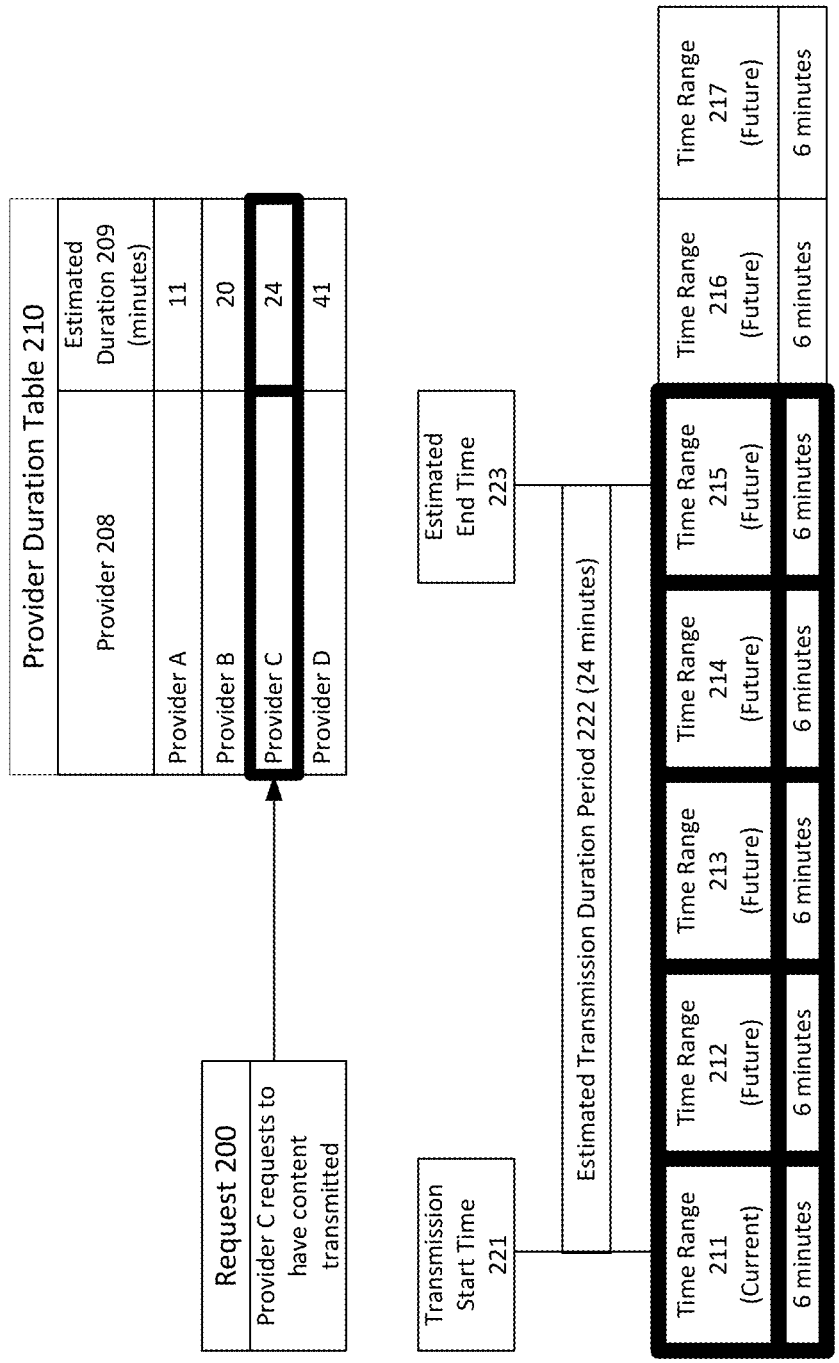
FIG. 2 is a diagram illustrating example duration data and time ranges that may be used in accordance with the present disclosure.

In particular, referring now to FIG. 2, some example provider duration data 122 will now be described in detail. Specifically, as shown in FIG. 2, video transmission service 120 may receive a request from a particular provider ("Provider C") to transmit video content from Provider C to one or more viewers. As also shown in FIG. 2, upon receiving request 200, quality adjustor 127 may request provider duration data 122 associated with Provider C. For example, in some cases, the provider duration data 122 may include a provider duration table 210 such as shown in FIG. 2. The provider duration table 210 includes a provider column 208 identifying various example providers for which provider duration data 122 has been collected. Additionally, the provider duration table 210 includes an estimated duration column 209 identifying an estimated transmission duration for content that is being transmitted from the respective provider listed in each row of the table 210. As set forth above, the estimated durations shown in table 210 may be calculated, for example, based on an average historical transmission duration for content items from each of the listed providers, such as determined from viewer feedback data 140 of FIG. 1. The estimated durations may also be calculated based on other factors, such as those described in detail above and not repeated here. As shown, the estimated transmission duration for Provider C is identified in table 210 as 24 minutes.

As also shown in FIG. 2, an upcoming time period may be divided into a number of time ranges 211-217, which, as described below, may correlate to time ranges included in upgrade threshold data 123. In this particular example, each of time ranges 211-217 includes a six minute block of time. It is noted, however, that time ranges of any desired duration may be employed, and that all time ranges need not necessarily have equivalent durations. Time range 211 is a current time range, meaning that the request 200 is received at some point within time range 211. Time ranges 212-217 are future time ranges, meaning that those time ranges have not yet been entered into at the time that request 200 is received. Transmission start time 221 is a vertical line indicating a time at which transmission of the requested video content is expected to begin. Estimated transmission duration period 222 is a time period (represented by a vertical bar in FIG. 2) that indicates an estimated duration of the content from Provider C, which, as set forth above, is estimated to be 24 minutes. Estimated end time 223 is a vertical line indicating an estimated time at which transmission of the requested video content will end if it is transmitted for the exact estimated duration of 24 minutes. Thus, as can be seen from FIG. 2, it can be determined, if the estimated transmission duration is assumed to be accurate, that the transmission of the requested video content will span at least part of five different time ranges (i.e., time ranges 211-215). These spanned time ranges 211-215 are shown with bold borders in FIG. 2.

Figure 3:
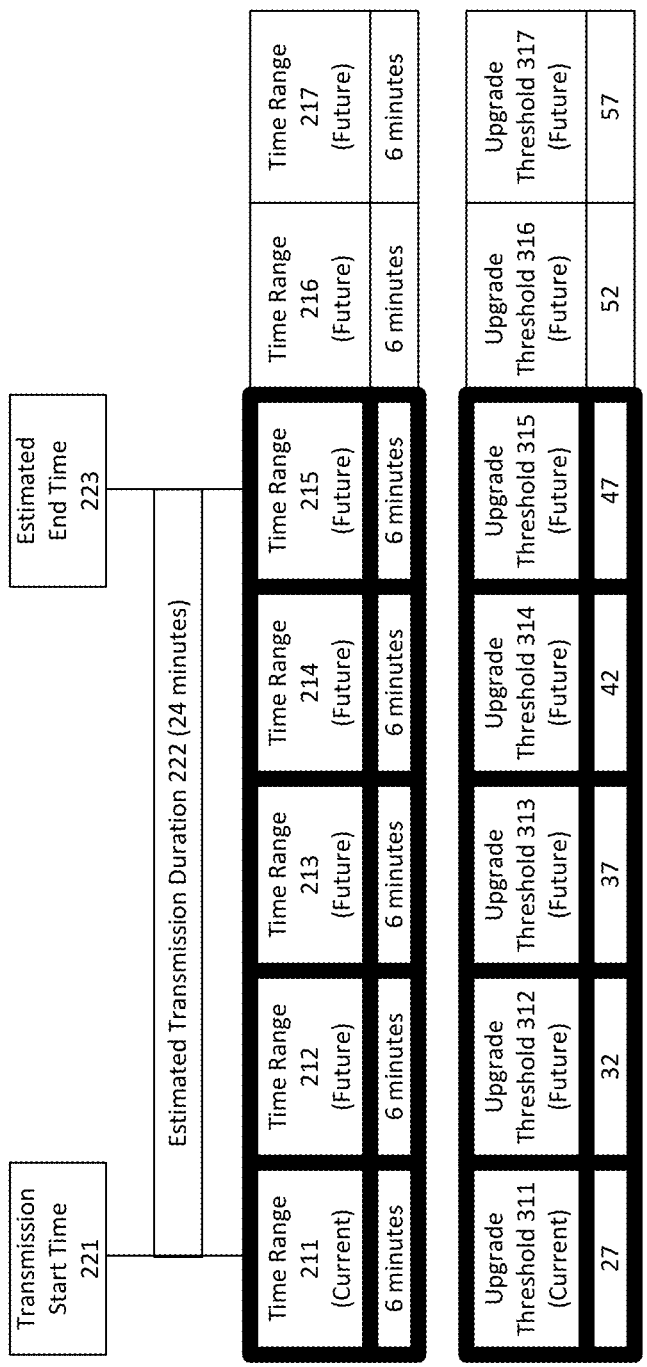
FIG. 3 is a diagram illustrating example time range thresholds that may be used in accordance with the present disclosure.

Referring now to FIG. 3, some example time range thresholds will now be described in detail. In particular, as shown in FIG. 3, each of time ranges 211-217 may have a respective upgrade threshold 311-317, for example as may be indicated in upgrade threshold data 123 of FIG. 1. In particular, time range 211 has a respective upgrade threshold value of 27, time range 212 has a respective upgrade threshold value of 32, time range 213 has a respective upgrade threshold value of 37, time range 214 has a respective upgrade threshold value of 42, time range 215 has a respective upgrade threshold value of 47, time range 216 has a respective upgrade threshold value of 52, and time range 217 has a respective upgrade threshold value of 57. As set forth above, in some examples, an upgrade threshold value may be used indicate a minimum provider score that a provider is required to meet or exceed in order to be entitled to an encoding upgrade.

In some examples, an upgrade threshold for a current time range (e.g., time range 211) may be determined based, at least in part, on amounts of transmission resources that are currently available to video transmission service 120 and that are currently being used and/or not used by video transmission service 120. For example, video transmission service 120 may monitor its currently available, used, and unused transmission resources in order to determine a current upgrade threshold. These resources may include, for example, a quantity of available encoding channels that are used and/or not used, an amount of available processing resources that are used and not/used, and various other available, used, and/or unused transmission resources. In some examples, the current upgrade threshold value may generally correlate to the amount of used and/or unused transmission resources. For example, during times when relatively more transmission resources are being consumed, the video transmission service 120 may have fewer remaining resources to devote to additional encoding channels for new video transmissions. Thus, in some examples, the upgrade threshold may be set to a higher value at these times in order to help conserve remaining resources for providers with higher provider scores and potentially larger viewership. By contrast, during times when relatively fewer transmission resources are being consumed, the video transmission service 120 may have more remaining resources to devote to additional encoding channels for new video transmissions. Thus, in some examples, the upgrade threshold may be set to a lower value at these times in order to allow providers with lower provider scores (and their respective viewers) to benefit from additional encoding channels.

In some examples, video transmission service 120 may save resource usage data collected from prior time ranges as historical resource usage data. In some cases, upgrade thresholds for future time ranges (e.g., time ranges 212-217) may be determined based, at least in part, on historical resource usage data for that time range. For example, in some cases, the video transmission service 120 may set an upgrade threshold for a particular time range on a particular day based, at least in part, on the resource usage that was calculated for that same time period on a prior day. As another example, if historical resource usage data indicates that resource consumption typically begins to gradually increase every day starting at noon, then the time range associated with noon and subsequent time ranges may have gradually increasing upgrade thresholds in order to reflect this usage pattern.

In some cases, time ranges that are associated with relatively busier transmission times, such as peak transmission times, may be assigned a relatively higher upgrade threshold value. By contrast, in some cases, time ranges that are associated with relatively less busy transmission times, such as off-peak transmission times, may be assigned a relatively lower upgrade threshold value. In some examples, peak transmission time periods with higher threshold values may include times when larger numbers of viewers are generally able to access and view video content, such as afternoons, evenings, and weekends. By contrast, in some examples, off-peak transmission time periods with lower threshold values may include times when fewer viewers are generally able to access and view video content, such as nights and weekday mornings.

Also, in some examples, upgrade thresholds for future time ranges may also be adjusted up or down based on current observed resource usage data. For example, suppose that the current observed resource usage for current time range 211 is unusually high. In this case, the upgrade threshold for an upcoming future time range, such as time range 212, may be shifted up to a higher value in order to reflect current high usage conditions that are likely to affect the upcoming time range 212. By contrast, suppose that the current observed resource usage for current time range 211 is unusually low. In this case, the upgrade threshold for an upcoming future time range, such as time range 212, may be shifted down to a lower value in order to reflect current low usage conditions that are likely to affect the upcoming time range 212.

Figure 4:
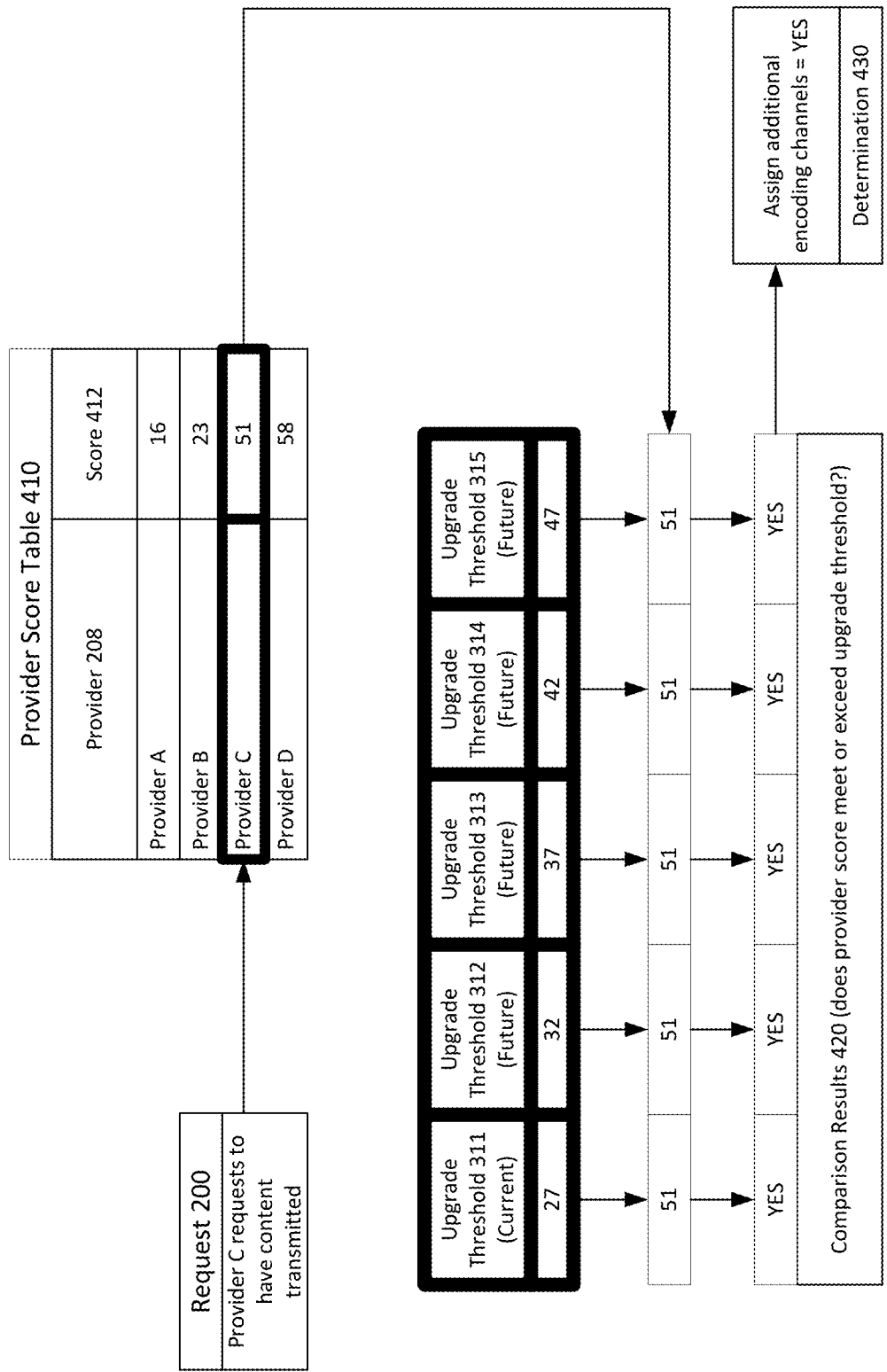
FIG. 4 is a diagram illustrating a first example encoding upgrade determination that may be used in accordance with the present disclosure.

Referring now to FIG. 4, an example encoding upgrade determination will now be described in detail. Specifically, as shown in FIG. 4, quality adjustor 127 may request provider score data 121 associated with Provider C. For example, in some cases, the provider score data 121 may include a provider score table 410 such as shown in FIG. 4. The provider score table 410 includes a provider column 208 identifying various example providers for which provider score data 121 has been collected. Additionally, the provider score table 410 includes a score column 412 identifying a provider score for the respective provider listed in each row of the table 410. As set forth above, the provider scores shown in table 410 may be calculated, for example, based on average historical viewership quantities for content items from each of the listed providers, such as determined from viewer feedback data 140 of FIG. 1. The provider scores may also be calculated based on other factors, such as those described in detail above and not repeated here. As shown, the estimated provider score for Provider C is identified in table 410 as 51.

As also shown in FIG. 4, upon being retrieved from table 410, the provider score of 51 for Provider C may be compared against the upgrade thresholds 311-315 for each of the time ranges 211-215 within which Provider C's requested content is estimated to be transmitted (e.g., as determined based on criteria depicted in FIG. 2 and described above). The example of FIG. 4 shows comparison results 420 for the comparisons of Provider C's score of 51 to each of the values of upgrade thresholds 311-315. In particular, in this example, Provider C's score of 51 exceeds each of values of upgrade thresholds 311-315, which are 27, 32, 37, 42 and 47, respectively. Thus, in this example, because Provider C's score of 51 exceeds each of values of upgrade thresholds 311-315, a determination 430 is made to assign additional encoding channels to Provider C for transmission of the video content corresponding to request 200.

Figure 5:
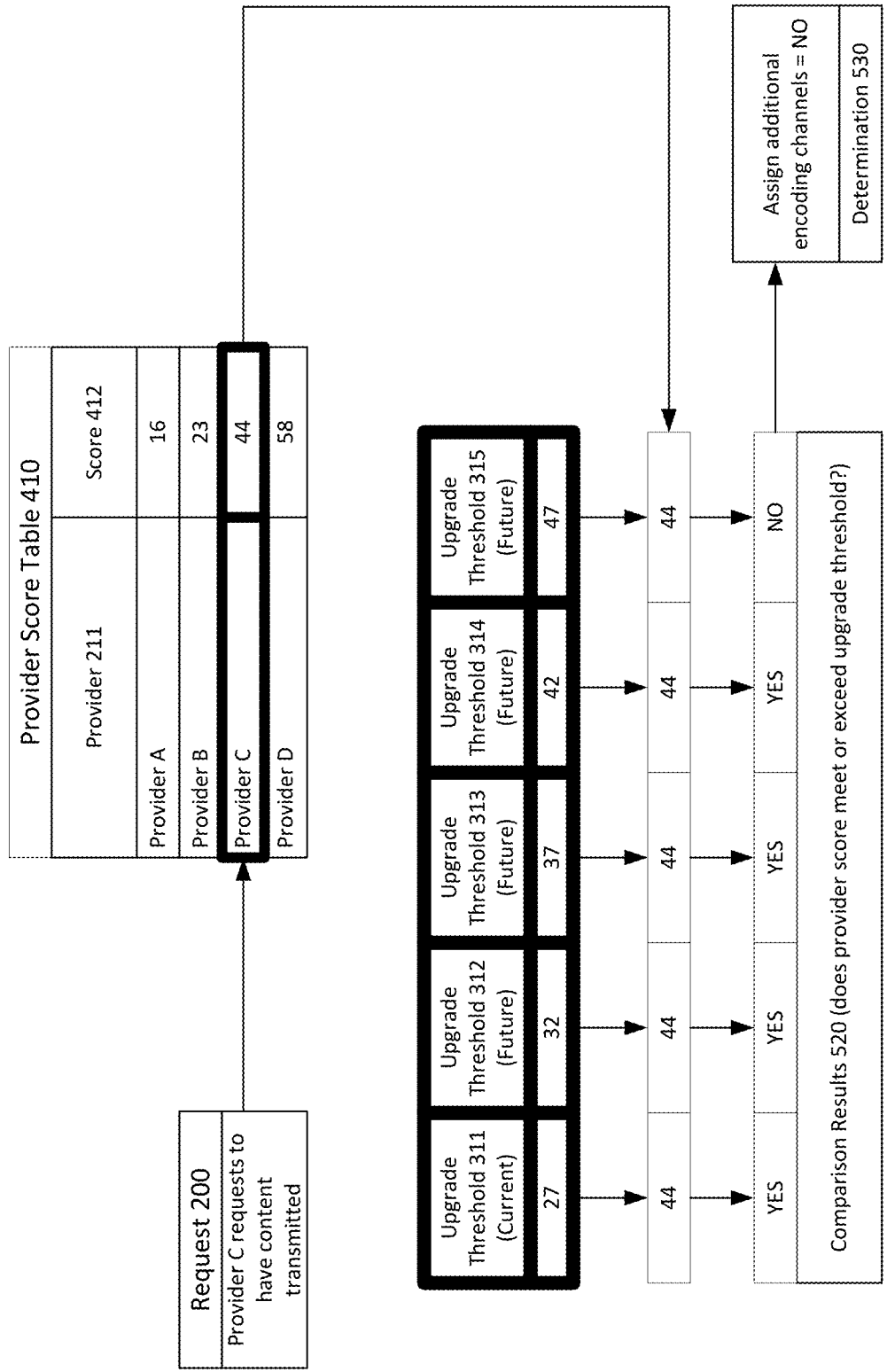
FIG. 5 is a diagram illustrating a second example encoding upgrade determination that may be used in accordance with the present disclosure.

Referring now to FIG. 5, another example encoding upgrade determination will now be described in detail. In particular, in the example of FIG. 5, the provider score for Provider C is decreased such it does not exceed all of the upgrade threshold values as in FIG. 4. Specifically, as shown in FIG. 5, the estimated provider score for Provider C is decreased from a score of 51 (as shown in FIG. 4) to a score of 44. The score of 44 can be seen in table 410 of FIG. 5 in the row corresponding to Provider C. In the example of FIG. 5, upon being retrieved from table 410, the provider score of 44 for Provider C may be compared against the upgrade thresholds 311-315 for each of the time ranges 211-215 within which Provider C's requested content is estimated to be transmitted (e.g., as determined in based on criteria depicted in FIG. 2 and described above). The example of FIG. 5 shows comparison results 520 for the comparisons of Provider C's score of 44 to each of the values of upgrade thresholds 311-315. In particular, in this example, Provider C's score of 44 exceeds each of values of upgrade thresholds 311-314, which are 27, 32, 37, and 42, respectively. However, Provider C's score of 44 does not meet or exceed the value of upgrade threshold 315, which is 47. Thus, in this example, because Provider C's score of 44 does not meet or exceed the value of upgrade threshold 315, a determination 530 is made to not assign additional encoding channels to Provider C for transmission of the video content corresponding to request 200.

Figure 6:
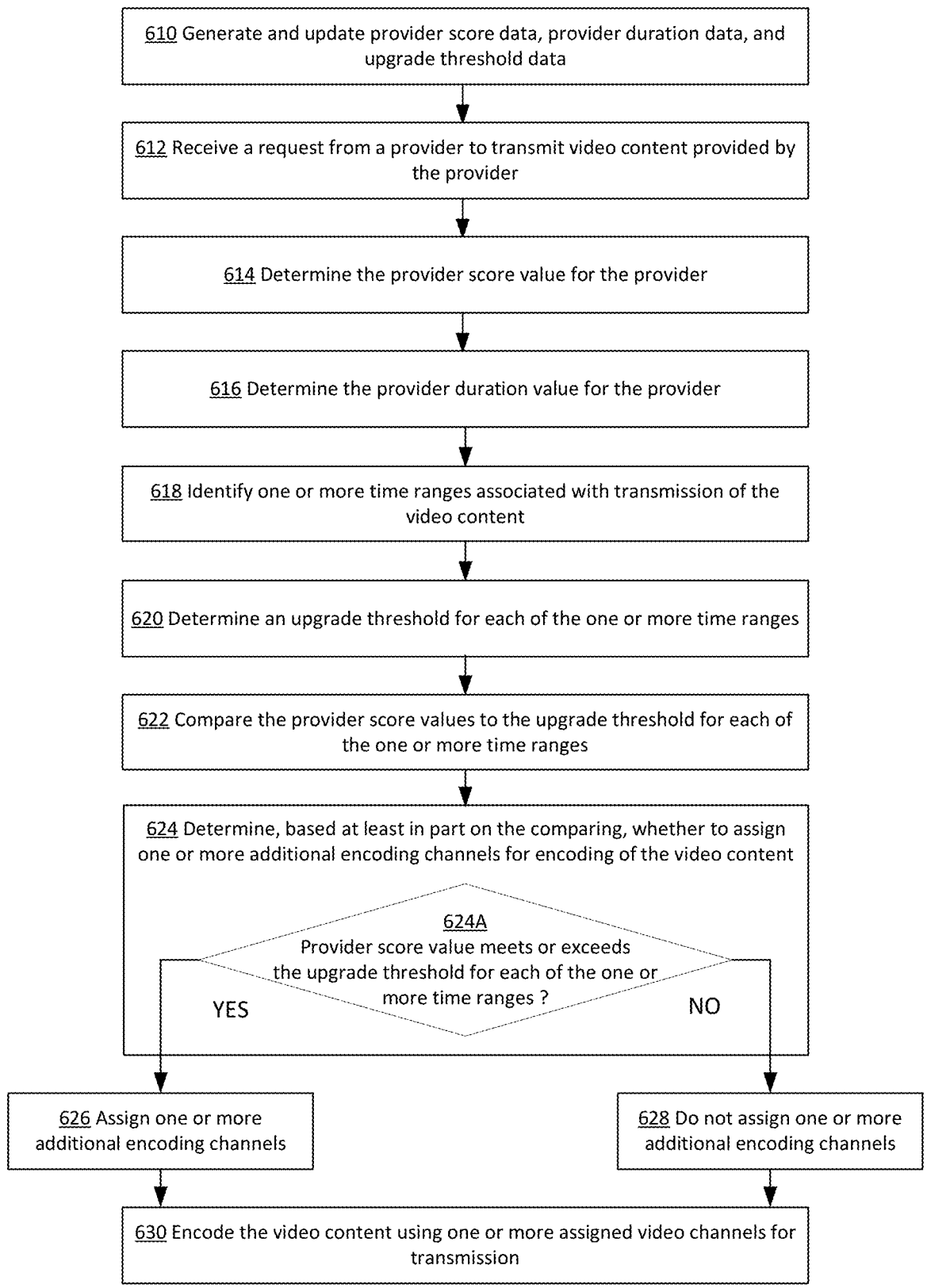
FIG. 6 is a flowchart illustrating an example process for video encoding based on viewer feedback that may be used in accordance with the present disclosure.

FIG. 6 is a flowchart illustrating an example process for video encoding based on viewer feedback that may be used in accordance with the present disclosure. The process of FIG. 6 is initiated at operation 610, at which provider score data, provider duration data, and upgrade threshold data are generated and updated, for example by a video transmission service. As set forth above, provider score data may indicate provider score values for various providers that have provided video content to the video transmission service. A provider score value may be a value associated with a quantity of viewers for content provided by a respective provider. For example, the provider score value may indicate an estimated quantity of viewers for video content provided by a respective provider. A provider score value may also indicate a relative estimated quantity of viewers for a respective provider, for example relative to one or more other providers. A provider score value may be determined based, at least in part, on one or more quantities of viewers of prior transmitted content provided by a respective provider, such as a moving average quantity of viewers of prior transmitted content provided by a respective provider. In some examples, the provider score values may be determined based on viewer feedback data collected from one or more viewers of video content, such as described in detail above. The provider score values may be continually updated as new viewer feedback data is received.

The provider duration data may indicate provider duration values for various providers that have provided video content to the video transmission service. A provider duration value may be a value associated with a transmission duration for content provided by a respective provider. For example, the provider duration value may indicate an estimated transmission duration for video content provided by a respective provider. A provider duration value may be determined based, at least in part, on one or more transmission durations of prior transmitted content provided by a respective provider, such as a moving average transmission duration of prior transmitted content provided by a respective provider. In some examples, the provider duration values may be determined based on viewer feedback data received from one or more viewers of video content, such as described in detail above. The provider duration values may be continually updated as new viewer feedback data is received.

The upgrade threshold data may indicate upgrade threshold values. An upgrade threshold value is a value associated with an encoding upgrade, such as an assignment of one or more additional encoding channels in combination with at least a first assigned encoding channel for encoding of video content. For example, an upgrade threshold value may indicate a minimum provider score that is required in order for a provider to receive an encoding upgrade. In some examples, multiple upgrade thresholds may be determined, each associated with a respective time range. In some examples, the upgrade threshold values may be determined and updated based, at least in part, on current and/or historical transmission resource usage by a video transmission service, such as processing usage, encoding channel usage, memory usage, and other resource usages.

At operation 612, a request is received from a provider to transmit video content provided by the provider. For example, as set forth above, a provider may send a request to a video transmission service for the service to transmit content that is provided to the video transmission service by the provider. In some examples, the video content may be live streaming video content, such as content that is captured by the provider, transmitted promptly by the provider to the video transmission service, and then transmitted promptly by the video transmission service to one or more viewers, for example that view the content while subsequent portions of the content are still being captured and transmitted.

At operation 614, a provider score value is determined for the provider that is requesting transmission of the video content. For example, in some cases, an encoding component may issue an application programming interface (API) call to retrieve a current provider score value for the provider, for example by providing a name or other identifier of the provider. In some examples, the API call may be processed by searching the provider score data using an identifier for the provider in order to retrieve the score value for the provider. For example, as shown in FIGS. 4 and 5, the provider score data may sometimes include one or more tables or other information that identifies various providers and their respective provider score values.

At operation 616, a provider duration value is determined for the provider that is requesting transmission of the video content. For example, in some cases, an encoding component may issue an API call to retrieve a current provider duration value for the provider, for example by providing a name or other identifier of the provider. In some examples, the API call may be processed by searching the provider duration data using an identifier for the provider in order to retrieve the current duration value for the provider. For example, as shown in FIG. 2, the provider duration data may sometimes include one or more tables or other information that identifies various providers and their current respective provider duration values.

At operation 618, one or more time ranges associated with transmission of the requested video content are identified. As set forth above, the time ranges associated with transmission of the requested video content may include time ranges having at least a portion within which at least part of the requested video content is estimated to be transmitted. For example, as shown in FIG. 2, the identified time ranges may be identified by determining an estimated transmission duration period 222 for the content, such as a time period equivalent to the provider duration value and extending forward from a start time 221 of the transmission. Each time range 211-215 that has at least a portion that includes at least part of the estimated duration period 222 may then be identified at operation 618 as being associated with transmission of the requested video content.

At operation 620, an upgrade threshold for each of the one or more time ranges identified at operation 618 is determined. For example, in some cases, an encoding component may issue an API call that indicates each identified time range and that requests a current upgrade threshold value for each identified time range. In some examples, the API call may be processed by searching the upgrade threshold data using the identified time periods in order to retrieve a current upgrade threshold for each the identified time period. For example, as shown in FIG. 3, the upgrade threshold data may sometimes include one or more tables or other information that identifies various time ranges and their current respective upgrade threshold values.

At operation 622, the provider score value for the requesting provider may be compared to the upgrade threshold value for each identified time period that is determined at operation 620. For example, in some cases, the provider score value may be compared to each upgrade threshold to determine whether the provider score value meets or exceeds each upgrade threshold, such as shown in FIGS. 4 and 5 and described in detail above. At operation 624, it is determined based, at least in part of the comparing of operation 622, whether to assign one or more additional encoding channels for encoding of the requested video content. For example, in some cases, operation 622 may include sub-operation 624A, at which it is determined whether the provider score value for the provider meets or exceeds the upgrade threshold for each of the one or more time ranges. In some examples, if the provider score value for the provider meets or exceeds the upgrade threshold for each of the one or more time ranges, then, at operation 626, the one or more additional encoding channels are assigned for encoding of the requested video content. An example of this scenario is depicted in FIG. 4, in which the provider score of 51 exceeds each of the upgrade threshold values (e.g., 27, 32, 37, 42, and 47). By contrast, in some examples, if the provider score value for the provider does not meet or exceed the upgrade threshold for each of the one or more time ranges, then, at operation 628, the one or more additional encoding channels are not assigned for encoding of the requested video content. An example of this scenario is depicted in FIG. 5, in which the provider score of 44 does not meet or exceed the upgrade threshold value of 47.

At operation 630, the requested video content is encoded using one or more assigned encoding channels for transmission to one or more viewers. For example, if the one or more additional encoding channels are assigned at operation 626, then the video content may be encoded using at least a first encoding channel in combination with the one or more additional encoding channels. Each of the at least first encoding channel and the one or more additional encoding channels may have a different image quality (e.g., encoding bitrate, resolution, etc.) with respect to one another. Each viewer of the video content may then select to receive a particular assigned encoding channel having a respective image quality that is suited for that viewer's particular respective transmission characteristics (e.g., network conditions, processing and memory resources, etc.). By contrast, if the one or more additional encoding channels are not assigned at operation 628, then the video content may be encoded using at least the first encoding channel but not using the one or more additional encoding channels. Upon being encoded, the requested video content may be transmitted to one or more viewers, for example using live streaming video transmission techniques.

Figure 7:
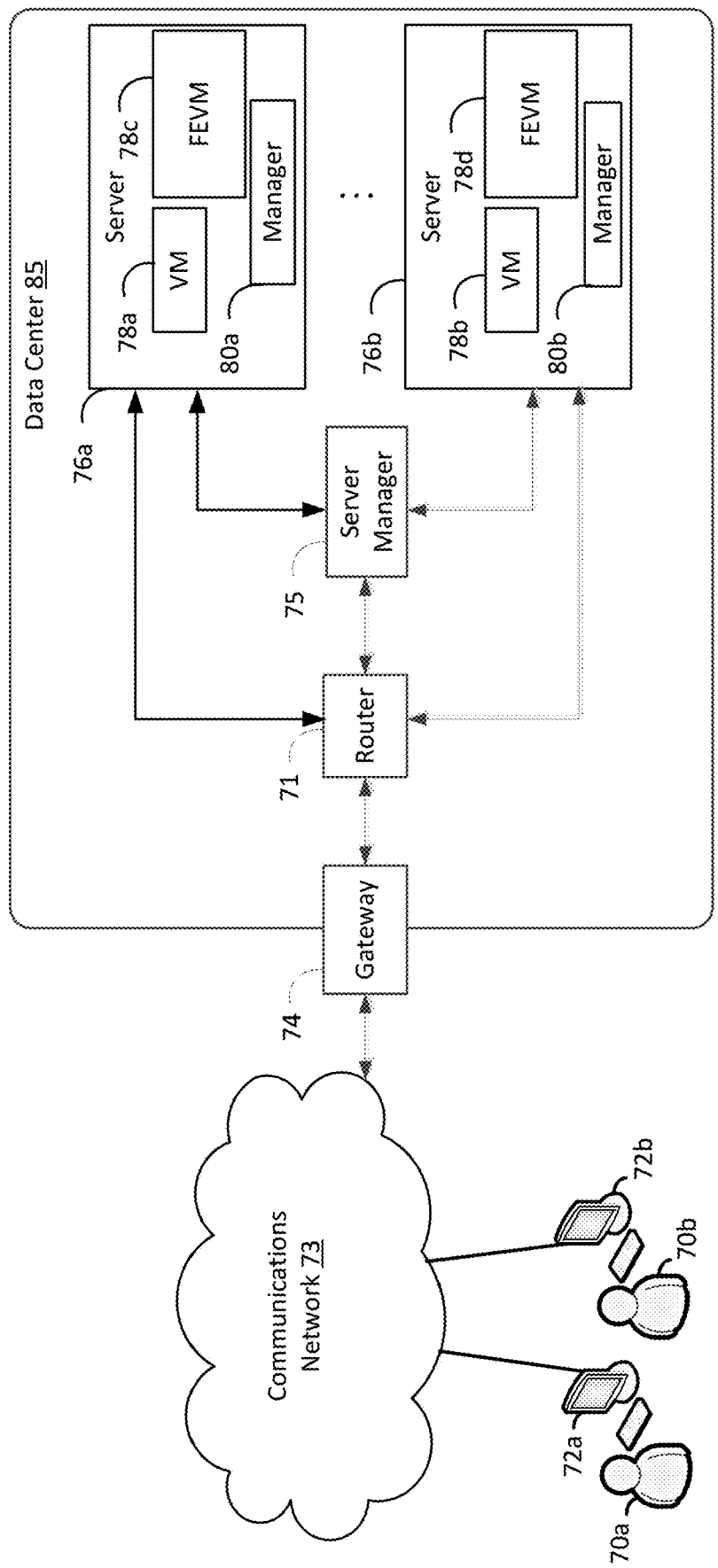
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are feedback encoding virtual machine ("FEVM") instances. The FEVM virtual machine instances 78c and 78d may be configured to perform various aspects of the viewer feedback encoding techniques and/or any other of the disclosed techniques in accordance with the present disclosure and described in detail above. As should be appreciated, while the particular example illustrated in FIG. 7 includes one FEVM virtual machine in each server, this is merely an example. A server may include more than one FEVM virtual machine or may not include any FEVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
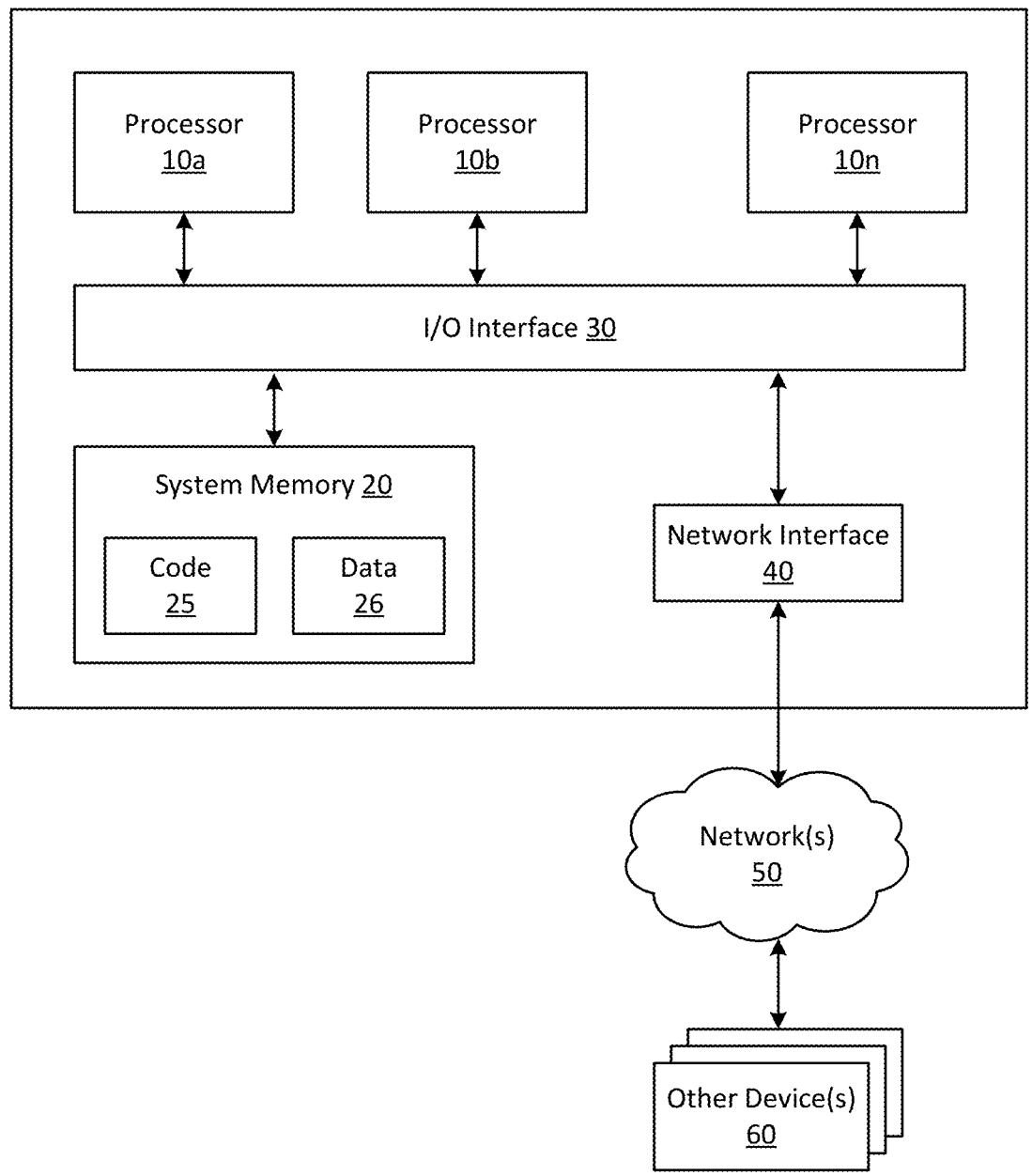
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for encoding live streaming video content provided by a provider comprising:
   one or more processors; and
   one or more memories having stored therein instructions that, upon execution by the one or more processors, cause the computing system perform operations comprising:
   determining a first value associated with a quantity of viewers for the live streaming video content, wherein the first value is determined based, at least in part, on one or more quantities of viewers of prior transmitted video content provided by the provider;
   determining an estimated duration of an upcoming transmission of the live streaming video content based, at least in part, on one or more durations of the prior transmitted video content provided by the provider;
   determining, based on the estimated duration, one or more future time ranges associated with the upcoming transmission of the live streaming video content by adding a time period having the estimated duration to a start time of the transmission and determining that the one or more future time ranges are included in the time period;
   determining, for each of the one or more future time ranges, a respective threshold associated with assignment of one or more additional channels in combination with at least a first channel for encoding of the live streaming video content, wherein the first channel and the one or more additional channels each have different image qualities with respect to one another;
   comparing the first value to the respective threshold for each of the one or more future time ranges;
   determining, based at least in part on the comparing, to assign the one or more additional channels for the encoding of the live streaming video content; and
   encoding the live streaming video content using the first channel and the one or more additional channels for transmission of the live streaming video content.

2. A computer-implemented method for encoding live streaming video content provided by a provider comprising:
   determining a first value associated with a quantity of viewers for the live streaming video content, wherein the first value is determined based, at least in part, on one or more quantities of viewers of prior transmitted video content provided by the provider;
   determining an estimated duration of an upcoming transmission of the live streaming video content based, at least in part, on one or more durations of the prior transmitted video content provided by the provider;
   determining, based on the estimated duration, one or more future time ranges associated with the upcoming transmission of the live streaming video content by adding a time period having the estimated duration to a start time of the transmission and determining that the one or more future time ranges are included in the time period;
   determining, for each of the one or more future time ranges, a respective threshold associated with assignment of one or more additional channels in combination with at least a first channel for encoding of the live streaming video content, wherein the first channel and the one or more additional channels each have different image qualities with respect to one another;

comparing the first value to the respective threshold for each of the one or more future time ranges; and determining, based at least in part on the comparing, to assign the one or more additional channels for the encoding of the live streaming video content; and encoding the live streaming video content using the first channel and the one or more additional channels for transmission of the live streaming video content.

3. The computer-implemented method of claim 2, wherein the estimated duration is determined based, at least in part, on a moving average transmission duration of the prior transmitted video content provided by the provider.

4. The computer-implemented method of claim 2, wherein the first value is determined based, at least in part, on a moving average quantity of viewers of the prior transmitted video content provided by the provider.

5. The computer-implemented method of claim 2, wherein the first value is determined based, at least in part, on feedback data collected from one or more video content viewers.

6. The computer-implemented method of claim 2, wherein the one or more additional channels are assigned for the transmission of the live streaming video content when the first value meets or exceeds the respective threshold for each of the one or more future time ranges.

7. One or more non-transitory computer-readable storage media having stored thereon instructions that, upon execution by one or more computing devices, cause the one or more compute nodes to perform operations comprising:

determining a first value associated with a quantity of viewers for live streaming video content, wherein the first value is determined based, at least in part, on one or more quantities of viewers of prior transmitted video content provided by a provider;

determining an estimated duration of an upcoming transmission of the live streaming video content based, at least in part, on one or more durations of the prior transmitted video content provided by the provider;

determining, based on the estimated duration, one or more future time ranges associated with the upcoming transmission of the live streaming video content by adding a time period having the estimated duration to a start time of the transmission and determining that the one or more future time ranges are included in the time period;

determining, for each of the one or more future time ranges, a respective threshold associated with assignment of one or more additional channels in combination with at least a first channel for encoding of the live streaming video content, wherein the first channel and the one or more additional channels each have different image qualities with respect to one another;

comparing the first value to the respective threshold for each of the one or more future time ranges; and determining, based at least in part on the comparing, to assign the one or more additional channels for the encoding of the live streaming video content; and encoding the live streaming video content using the first channel and the one or more additional channels for transmission of the live streaming video content.

8. The one or more non-transitory computer-readable storage media of claim 7, wherein the first value is determined based, at least in part, on a moving average quantity of viewers of the prior transmitted video content provided by the provider.

9. The one or more non-transitory computer-readable storage media of claim 7, wherein the estimated duration is determined based, at least in part, on a moving average transmission duration of the prior transmitted video content provided by the provider.

10. The one or more non-transitory computer-readable storage media of claim 7, wherein the first value is determined based, at least in part, on feedback data collected from one or more video content viewers.

11. The one or more non-transitory computer-readable storage media of claim 7, wherein the one or more additional channels are assigned for the transmission of the live streaming video content when the first value meets or exceeds the respective threshold for each of the one or more future time ranges.

12. The computing system of claim 1, wherein the first value is determined based, at least in part, on a moving average quantity of viewers of the prior transmitted video content provided by the provider.

13. The computing system of claim 1, wherein the estimated duration is determined based, at least in part, on a moving average transmission duration of the prior transmitted video content provided by the provider.

14. The computing system of claim 1, wherein the first value is determined based, at least in part, on feedback data collected from one or more video content viewers.

15. The computing system of claim 1, wherein the one or more additional channels are assigned for the transmission of the live streaming video content when the first value meets or exceeds the respective threshold for each of the one or more future time ranges.

* * * * *